United States Patent
Herrero (10) Patent No.: US 9,929,879 B2
(45) Date of Patent: Mar. 27, 2018

(54) MULTIPATH SUPPORT OF REAL-TIME COMMUNICATIONS

(71) Applicant: Oracle International Corporation, Redwood Shores, CA (US)

(72) Inventor: Rolando Herrero, Derry, NH (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 392 days.

(21) Appl. No.: 14/734,300

(22) Filed: Jun. 9, 2015

(65) Prior Publication Data

US 2016/0365989 A1    Dec. 15, 2016

(51) Int. Cl.
| | |
|---|---|
| *G06F 15/16* | (2006.01) |
| *H04L 12/46* | (2006.01) |
| *H04L 29/06* | (2006.01) |
| *H04L 12/26* | (2006.01) |
| *H04L 12/24* | (2006.01) |

(52) U.S. Cl.
CPC ...... *H04L 12/4633* (2013.01); *H04L 41/0806* (2013.01); *H04L 43/0864* (2013.01); *H04L 65/608* (2013.01); *H04L 65/80* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,766,376 B2 | 7/2004 | Price | |
| 7,796,999 B1 | 9/2010 | Martin et al. | |
| 7,873,727 B2 | 1/2011 | Pal et al. | |
| 8,094,556 B2 | 1/2012 | Michaelis et al. | |
| 8,218,439 B2 | 7/2012 | Deshpande | |
| 8,909,728 B2 * | 12/2014 | Kotecha | H04W 4/18 709/212 |
| 2005/0259694 A1 | 11/2005 | Garudadri et al. | |
| 2006/0203791 A1 * | 9/2006 | Carrion-Rodrigo | H04L 63/0892 370/338 |
| 2011/0296006 A1 * | 12/2011 | Krishnaswamy | H04L 29/12952 709/224 |
| 2013/0262691 A1 | 10/2013 | Bulava et al. | |

(Continued)

OTHER PUBLICATIONS

Acme Packet and CounterPath, Mar. 4, 2013, http://www.counterpath.com/assets/email/CounterPath-Acme-Packet-Partner-Brief.pdf.*

(Continued)

*Primary Examiner* — Brian Whipple
*Assistant Examiner* — Gregory P Tolchinsky
(74) *Attorney, Agent, or Firm* — Potomac Law Group, PLLC (57) ABSTRACT

A system is provided that performs multipath support functionality for real-time communications. The system receives a service request to enable multipath support functionality from a tunneling client. The system further creates tunnels using unique physical interfaces. The system further associates the tunnels with a single internal address space comprising internal addresses. The system further sends a service response to the tunneling client, the service response indicating that multipath support functionality has been enabled. The system further distributes media traffic within the tunnels based on dynamic path characteristics.

17 Claims, 4 Drawing Sheets

(56) References Cited

U.S. PATENT DOCUMENTS

| | | | | |
|---|---|---|---|---|
| 2014/0071983 A1* | 3/2014 | Banavalikar | ............ | H04L 45/72 |
| | | | | 370/389 |
| 2015/0029947 A1* | 1/2015 | Gundavelli | ........... | H04W 88/16 |
| | | | | 370/329 |
| 2016/0119938 A1* | 4/2016 | Frerking | ............... | H04W 72/10 |
| | | | | 370/316 |
| 2016/0226980 A1* | 8/2016 | Albrecht | .............. | G05B 19/418 |

OTHER PUBLICATIONS

Ivano Bartoli et al., "A synchronization control scheme for videoconferencing services", Journal of Multimedia, vol. 2, No. 4, Aug. 2007, http://ojs.academypublisher.com/index.php/jmm/article/viewFile/02040109/1198/.

Miroslaw Narbutt et al., "Adaptive playout buffering for audio/video transmission over the internet", Department of Computer Science, University College Dublin, Belfield Dublin 4, Ireland, http://www.csi.ucd.ie/staff/lmurphy/home/mypubs/mirek_UKTS_2001.pdf, May 2001.

Syed Hasan et al., "Cross Layer Protocol Support for Live Streaming Media", Department of Computer Science University of Otago, Dunedin, New Zealand, http://www.cs.otago.ac.nz/staffpriv/hzy/papers/aina08.pdf, 2008.

* cited by examiner

MULTIPATH SUPPORT OF REAL-TIME COMMUNICATIONS

FIELD

One embodiment is directed to a communications network, and more particularly, to delivering real-time traffic over a communications network.

BACKGROUND

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that performs multipath support functionality for real-time communications. The system receives a service request to enable multipath support functionality from a tunneling client. The system further creates tunnels using unique physical interfaces. The system further associates the tunnels with a single internal address space comprising internal addresses. The system further sends a service response to the tunneling client, the service response indicating that multipath support functionality has been enabled. The system further distributes media traffic within the tunnels based on dynamic path characteristics.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment transparently allows media traffic to be encapsulated and distributed over multiple tunnels using multiple physical interfaces based on dynamic path characteristics. In one embodiment, multiple tunnels, such as Tunneled Services Control Function tunnels, can be established between a tunneling server and a tunneling client using multiple radio or physical interfaces (e.g., Wi-Fi, or Long Term Evolution ("LTE"), etc.), where a radio or physical interface can be a transceiver configured to transmit and receive packets within one or more specified frequency bands. Further, media traffic, such as one or more encapsulated packets containing media data (e.g., audio data, video data, etc.) can be chunked, or otherwise divided, so that the media traffic is distributed among the available tunnels based on fixed ratios or quality of service ("QoS") metrics, such as packet loss, jitter, bit rate, bit error rate, end-to-end delay, round trip time ("RTT"), etc. This can leverage the fact that most mobile devices, or other client devices, support multiple radio or physical interfaces, and can further improve overall real time communication quality of the media traffic in a tunneled architecture. Further, because of the nature of the tunneled architecture, a client application within an application layer only sees one internal address space, such as a set of one or more internal addresses, such that the overall multipath functionality appears transparent to the client application.

Figure 1:
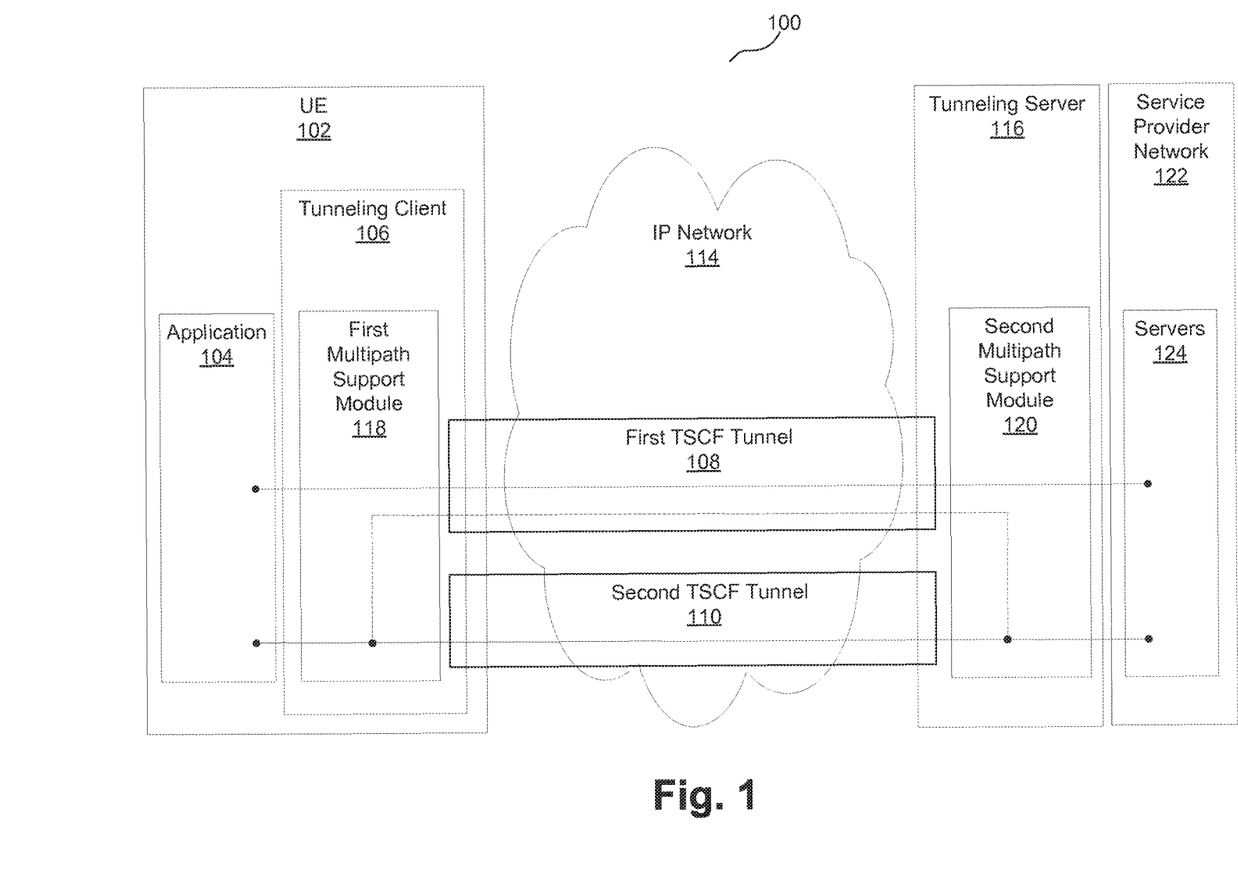
FIG. 1 illustrates an overall diagram of a network including network elements that can implement embodiments of the present invention and/or interact with embodiments of the invention.

FIG. 1 is an overview diagram of a network 100 including network elements that implement embodiments of the present invention and/or interact with embodiments of the invention. Network 100 includes a user equipment ("UE") 102 that performs real-time communications ("RTC") over an Internet Protocol ("IP") network 114 with a service provider network 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP") as described in, for example, Internet Engineering Task Force ("IETF") request for comments ("RFC") 793 and RFC 675, the User Datagram Protocol ("UDP") as described in, for example, IETF RFC 768), etc.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel, such as first TSCF tunnel 108 or second TSCF tunnel 110, that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of the TSCF tunnel between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage the TSCF tunnel such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify the TSCF tunnel, and a "Sequence" field that is incremented per message, as described in, for example, 3GPP TR 33.830 V0.5.0.

In one embodiment, in order to establish the TSCF tunnel, tunneling client 106 sends a "configuration request" message to tunneling server 116 to obtain configuration information for the TSCF tunnel. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to the TSCF tunnel. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, the TSCF tunnel is terminated.

In one embodiment, UE 102 executes an application 104 that may be a SIP based RTC application relying on a library such as the software development kit ("SDK") provided by the tunneled session management solution from Oracle Corporation.

Figure 2:
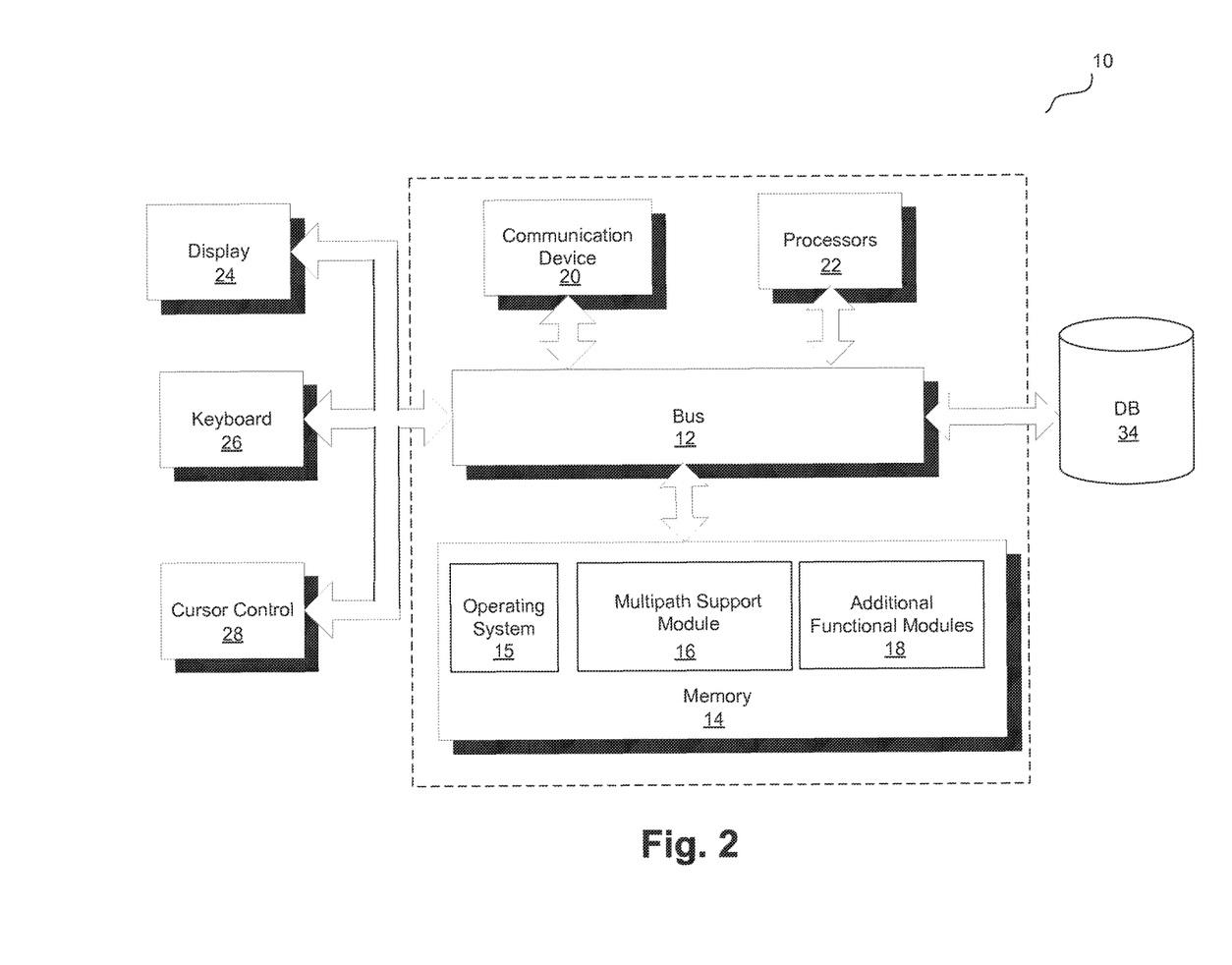
FIG. 2 illustrates a block diagram of a system that can implement an embodiment of the invention.

FIG. 2 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a multipath support module 16, as well as other functional modules 18. Operating system 15 can provide an operating system functionality for system 10. Multipath support module 16 can provide functionality for providing multipath support, and all other disclosed functionality, as further disclosed below. In certain embodiments, multipath support module 16 can comprise a plurality of modules, where each module provides specific individual functionality for providing multipath support and all other disclosed functionality. In one example embodiment, multipath support module 16 may implement tunneling server 116 of FIG. 1 in conjunction with one or more remaining elements of FIG. 2. System 10 can also be part of a larger system. Thus, system 10 can include one or more additional functional modules 18 to include the additional functionality. For example, functional modules 18 may include modules that provide additional functionality, such as functionality of an "Acme Packet 4500" product by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Referring to FIG. 1, with known systems, speech and video call quality problems due to network impairments are typical of RTC based on encapsulated media. Previous industry approaches to solving these problems range from redundancy via forward error correction ("FEC") to mechanisms of automatic repeat request ("ARQ") and hybrid schemes ("HEC"). However, in many cases, especially when a tunnel is stream-based, these solutions can severely aggravate the problems they are supposed to address as they can introduce heavy outer layer congestion.

In contrast to previous systems, embodiments of the present invention address the problems described above by leveraging the fact that most mobile devices, or other client devices, support multiple radio or physical interfaces (e.g., Wi-Fi, LTE, etc.), and therefore can be used to simultaneously route tunneled traffic through multiple radio or physical interfaces. In other words, a tunneling client (such as tunneling client 106 of FIG. 1) and a tunneling server (such as tunneling server 116 of FIG. 1) can create multiple tunnels, chunk media traffic, and distribute the chunked media traffic among the available tunnels based on fixed ratios or QoS metrics, such as packet loss, jitter, bit rate, bit error rate, end-to-end delay, RTT, etc.

One embodiment provides multipath support functionality through a first multipath support module 118 at tunneling client 106 and a second multipath support module 120 at tunneling server 116. In this embodiment, as described below in greater detail, application 104 sends a request to enable multipath support on a specific inner socket. Further, first multipath support module 118 determines whether it has access to multiple physical interfaces, and sends a request to enable multipath support to second multipath support module 120, where the request to enable multipath support includes a number of available physical interfaces identified by first multipath support module 118. In this embodiment, first multipath support module 118 and second multipath support module 120 may have already established first TSCF tunnel 108. In response to receiving the request to enable multipath support, second multipath support module 120 reserves one or more additional TSCF tunnels, such as second TSCF tunnel 110, with the same characteristics as any original TSCF tunnels, such as first TSCF tunnel 108. First multipath support module 118 subsequently creates the one or more reserved additional TSCF tunnels, such as second TSCF tunnel 110, and distributes inner socket traffic among the available TSCF tunnels, such as first TSCF tunnel 108 and second TSCF tunnel 110. Further, second multipath support module 120 also distributes inner socket traffic among the available TSCF tunnels, such as first TSCF tunnel 108 and second TSCF tunnel 110. Further, whenever multipath TSCF tunnels are created, first multipath support module 118 causes tunneling client 106 to notify application 104 of the multipath TSCF tunnels.

Figure 3:
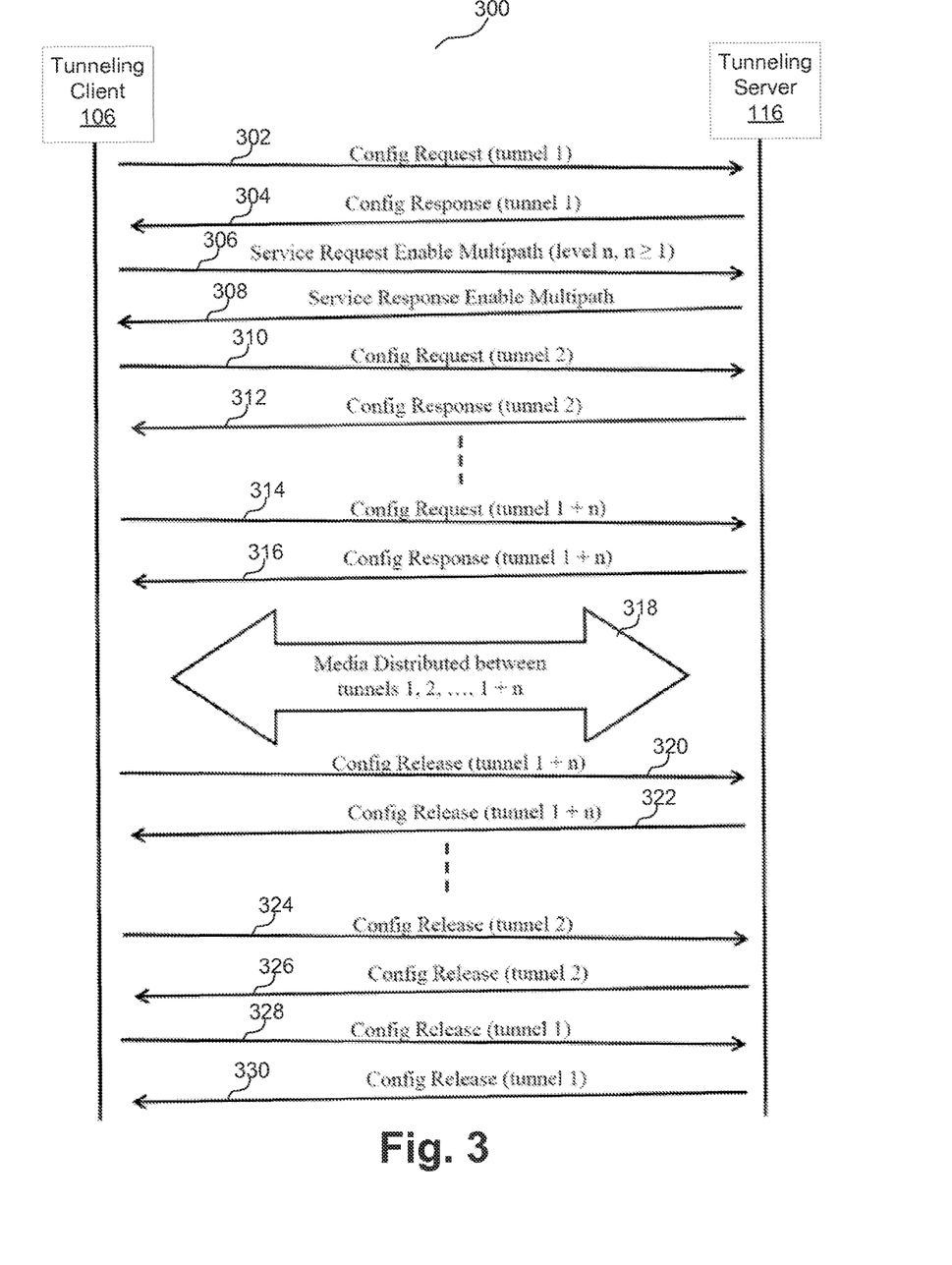
FIG. 3 illustrates a message sequence diagram that shows a sequence of messages exchanged between a tunneling client and a tunneling server in order to support multipath media tunneling, according to an embodiment of the invention.

FIG. 3 illustrates an example message sequence diagram 300 that shows a sequence of TSCF control messages exchanged between a tunneling client 106 and a tunneling server 116 in order to support multipath media tunneling, according to an embodiment of the invention. FIG. 3 includes network elements such as tunneling client 106 and tunneling server 116 as previously described in conjunction with FIG. 1.

At 302, tunneling client 106 sends a configuration request message to tunneling server 116 to establish an initial TSCF tunnel (identified in FIG. 3 as "tunnel 1"), where an example of the initial TSCF tunnel can be first TSCF tunnel 108. Further, at 304, tunneling server 116 responds to the configuration request message of tunneling client 106 with a configuration response message. Configuration request and response messages allow for tunneling client 106 to obtain configuration information for first TSCF tunnel 108 from tunneling server 116, as described in, for example, 3GPP TR 33.830 V0.5.0. In one embodiment, from the RTC application perspective, application 104 at UE 102 creates first TSCF tunnel 108 by executing a "tsc_ctrl_new_tunnel" API, and the configuration request message is sent in response to the execution of this API. According to the embodiment, first TSCF tunnel 108 corresponds to a specific physical interface.

At 306, tunneling client 106 sends a service request message to tunneling server 116 to enable multipath media. In other words, tunneling client 106 sends a service request message to tunneling server 116 to enable additional TSCF tunnels, where media traffic (e.g., encapsulated packets including media data) can be distributed among the additional TSCF tunnels. Further, at 308, tunneling server 116 responds to the service request message of tunneling client 106 with a service response message. In one embodiment, in order to enable multipath media, application 104 at UE 102 executes a "tsc_setsockopt" API on an inner socket, which causes tunneling client 106 to detect a number of available extra physical interfaces (i.e., a number of available physical interfaces other than the physical interface that corresponds to first TSCF tunnel 108), and to encode the detected number of available extra physical interfaces as a "level" value within the service request message. In FIG. 3, the level value is illustrated as "n", where n indicates the detected number of available extra physical interfaces, and thus, also indicates the requested number of additional TSCF tunnels. Further, in response to receiving the service request message, tunneling server 116 reserves a number of additional TSCF tunnels that is equal to the level value within the service request message (i.e., n additional TSCF tunnels), where the n additional TSCF tunnels can include second TSCF tunnel 110. Tunneling server 116 further establishes the n additional TSCF tunnels using the same configuration as that of first TSCF tunnel 108, including the same internal address space (i.e., a set of one or more internal addresses). In other words, tunneling server 116 associates the n additional TSCF tunnels with a same internal address space as the initial TSCF tunnel. Tunneling server 116 further includes a list of reserved tunnel identifiers within the service response request message that is sent from tunneling server 116 to tunneling client 106, where the list of reserved tunnel identifiers uniquely identify the reserved additional TSCF tunnels.

Subsequently, tunneling client 106 sends several configuration request messages to tunneling server 116 to establish the n additional TSCF tunnels, and tunneling server 116 responds to the configuration request messages with configuration response messages. More specifically, as an example, at 310, tunneling client 106 sends a configuration request message to tunneling server 116 to establish a first additional TSCF tunnel (identified in FIG. 3 as "tunnel 2"), where the first additional TSCF tunnel can be second TSCF tunnel 110. Further, at 312, tunneling server 116 responds to the configuration request message of tunneling client 106 with a configuration response message. Configuration request and response messages allow for tunneling client 106 to obtain configuration information for second TSCF tunnel 110 from tunneling server 116, as described in, for example, 3GPP TR 33.830 V0.5.0. In one embodiment, from the RTC application perspective, application 104 at UE 102 creates second TSCF tunnel 110 by executing a "tsc_ctrl_new_tunnel" API, and the configuration request message is sent in response to the execution of this API. According to the embodiment, second TSCF tunnel 110 corresponds to a specific additional physical interface, where the additional physical interface is different from the physical interface that corresponds to first TSCF tunnel 108.

Further, these actions can be repeated for each of the n additional TSCF tunnels. As an example, at 314, tunneling client 106 sends a configuration request message to tunneling server 116 to establish an nth additional TSCF tunnel (identified in FIG. 3 as "tunnel 1+n"). Further, at 316, tunneling server 116 responds to the configuration request message of tunneling client 106 with a configuration response message.

At 318, both tunneling client 106 and tunneling server 116 distribute inner socket media, such as encapsulated packets including media data, among the multiple TSCF tunnels. In certain embodiments, both tunneling client 106 and tunneling server 116 can distribute inner socket media among the multiple TSCF tunnels based on fixed ratios or one or more dynamic path characteristics. Dynamic path characteristics can include one or more QoS metrics, such as packet loss, jitter, bit rate, bit error rate, end-to-end delay, RTT, etc. In some embodiments, both tunneling client 106 and tunneling server 116 can determine QoS metrics associated with a specific TSCF tunnel by sending QoS packets across the specified TSCF tunnel and analyzing the arrival of the QoS packets from the source to the destination. Thus, in some embodiments, both tunneling client 106 and tunneling server 116 can distribute inner socket media such that there is a uniform, or near-uniform, distribution of inner socket media across the multiple TSCF tunnels, where one of ordinary skill in the art would readily understand that "near-uniform" allows for a discrepancy of a number of encapsulated packets between the multiple TSCF tunnels based on the fact that a number of encapsulated packets may not be evenly divisible by the number of available TSCF tunnels, or based on the fact that the discrepancy of packets is within a pre-defined threshold value. Further, when an encapsulated packet is received either by tunneling client 106 or tunneling server 116, the encapsulated packet can be forwarded to an inner socket input queue regardless of an originating TSCF tunnel.

Subsequently, tunneling client 106 sends several configuration release request messages to tunneling server 116 to remove/terminate the initial TSCF tunnel and the n additional TSCF tunnels, and tunneling server 116 responds to the configuration release request messages with configuration release response messages. More specifically, as an example, at 320, tunneling client 106 removes/terminates the nth additional TSCF tunnel (identified in FIG. 3 as "tunnel 1+n") by sending a TSCF configuration release request message to tunneling server 116. At 322, tunneling server 116 responds to the configuration release request message of tunneling client 106 with a configuration release response message.

Further, these actions can be repeated for each of the n additional TSCF tunnels. As an example, at 324, tunneling client 106 removes/terminates second TSCF tunnel 110 (identified in FIG. 3 as "tunnel 2"), by sending a TSCF configuration release request message to tunneling server 116. At 326, tunneling server 116 responds to the configuration release request message of tunneling client 106 with a configuration release response message.

Subsequently, at 328, tunneling client 106 removes/terminates first TSCF tunnel 108 (identified in FIG. 3 as "tunnel 1"), by sending a TSCF configuration release request message to tunneling server 116. At 330, tunneling server 116 responds to the configuration release request message of tunneling client 106 with a configuration release response message.

In an embodiment, to support compression, the TSCF protocol can be expanded to include: a new Service_Type TLV to indicate multipath support; a new Connection_Info TLV to indicate source and destination transport and network endpoints; and a new Multipath_Level TLV to indicate a number of extra physical interfaces available for tunnel creation.

The following table summarizes the new TLVs, according to an example embodiment of the invention:

| TLV TYPE | | | SHORT/LONG | VALUE | | |
|---|---|---|---|---|---|---|
| NAME | VALUE | SEMANTICS | FORMAT | TYPE | LENGTH | NOTES |
| Connection_Info_IPv4 | 24 | Client Connection Info | Short | Octet String | | |
| Connection_Info_IPv6 | 25 | Client Connection Info | Short | Octet String | | |
| Service_Type | 27 | Service Type | Short | Unsigned integer | 1 byte | Enable_Multipath = 15 |
| Multipath_Level | 42 | Multipath Level | Short | Unsigned integer | 1 byte | |

In one embodiment, in order to enable inner socket traffic multipath support, an appropriate option can be set using a "tsc_setsockopt" API. The following pseudo-code can be used to set an appropriate option, according to an example embodiment of the invention:

```
int enable_multipath = 1;
int result =
tsc_setsockopt(rtp_socket, SOL_SOCKET, SO_TSC_MULTIPATH,
    (char *)&enable_multipath, sizeof(int));
```

Thus, the enable_multipath variable above signals whether multipath support is enabled (e.g., "1") or disabled (e.g., "0"). In an embodiment, where multipath support is enabled, a tunneling client internally determines a number of physical interfaces available and propagates the determined number as a level value, as previously described.

According to an embodiment, if tsc_setsockopt returns a value of "−1", the option was not set correctly. If tsc_setsockopt returns a value of "0", the option was set correctly, but circuit breakers won't be officially enabled until they are negotiated. Negotiation occurs as previously indicated (e.g., tunneling client 106 sends a service request to tunneling server 116; tunneling server 116 reserves any available additional tunnels; tunneling server 116 sends a list of reserved additional tunnels to tunneling client 106; tunneling client 106 creates the additional tunnels; and tunneling client 106 notifies application 104 that multipath support functionality is enabled). If a tunneling server (such as tunneling server 116) is not configured to support multipath support functionality, the negotiation will fail, and no additional tunnels will be created.

In one embodiment, a new notification tsc_notification_multipath can be used to notify a client application about the multipath functionality. The following pseudocode shows how the notification is enabled and what the notification callback function looks like, according to an example embodiment of the invention:

```
tsc_notification_enable(handle, tsc_notification_multipath,
    multipath_notification, NULL);
void multipath_notification(tsc_notification_data *notification)
{
    tsc_notification_multipath_info_data *multipath_data =
    (tsc_notification_multipath_ info_data
*)notification->data;
    if (multipath_data && multipath_data->available ==
    tsc_bool_true) {
        if (multipath_data->enabled == tsc_bool_true) {
            printf("multipath enabled notification on socket %d\n",
                multipath_data->socket);
        } else {
            printf("multipath notification playing on socket %d\n",
                multipath_data->socket);
        }
    } else {
        printf("multipath notification not allowed on socket %d\n",
            multipath_data->socket);
    }
}
```

The fourth NULL parameter in tsc_notification_enable is an opaque/private data pointer that can be recovered in the tsc_notification_data structure upon callback.

Thus, in one embodiment, a tunneling client (such as tunneling client 106 of FIG. 1) can notify an application that multipath functionality is supported via a tsc_notification_enable API.

In one embodiment, in order to enable circuit breakers, a new keyword multipath can be added to an assigned-services parameter in an tscf-interface configuration object, as shown in the below table:

| Parameter Name | XML tag | Data Type and Default | Value Ranges/ Possible Values | Required or Optional |
|---|---|---|---|---|
| assigned-services | assigned-services | String: Blank | multipath to enable circuit breakers | Optional |

An example complete interface configuration with new changes bolded is shown below, according to an example embodiment of the invention:

```
tscf-interface
    realm-id              access
    state                 enabled
    max-tunnels                      1000
    local-address-pools   lp-1
    assigned-services                SIP, multipath
    tscf-port
        address                      192.168.27.113
        port                 4567
        transport-protocol   TCP
        tls-profile
        rekey-profile
    last-modified-by      admin@console
    last-modified-date    2015-01-05 05:01:10
```

An example XML file with new changes bolded is shown below, according to an example embodiment of the invention:

```
<tscfInterface realmID='access'
    state='enabled'
    maxTunnels='1000'
    assignedServices='SIP,multipath'
    options="
    lastModifiedBy='admin@console'
    lastModifiedDate='2015-01-05 05:01:10'
    objectId='33'>
    <key>access</key>
    <localAddressPool name='lp-1'/>
    <tscfPort address='192.168.27.113'
        port='4567'
        transProtocol='TCP'
        tlsProfile="
        rekeyProfile="
</tscfInterface>
```

Figure 4:
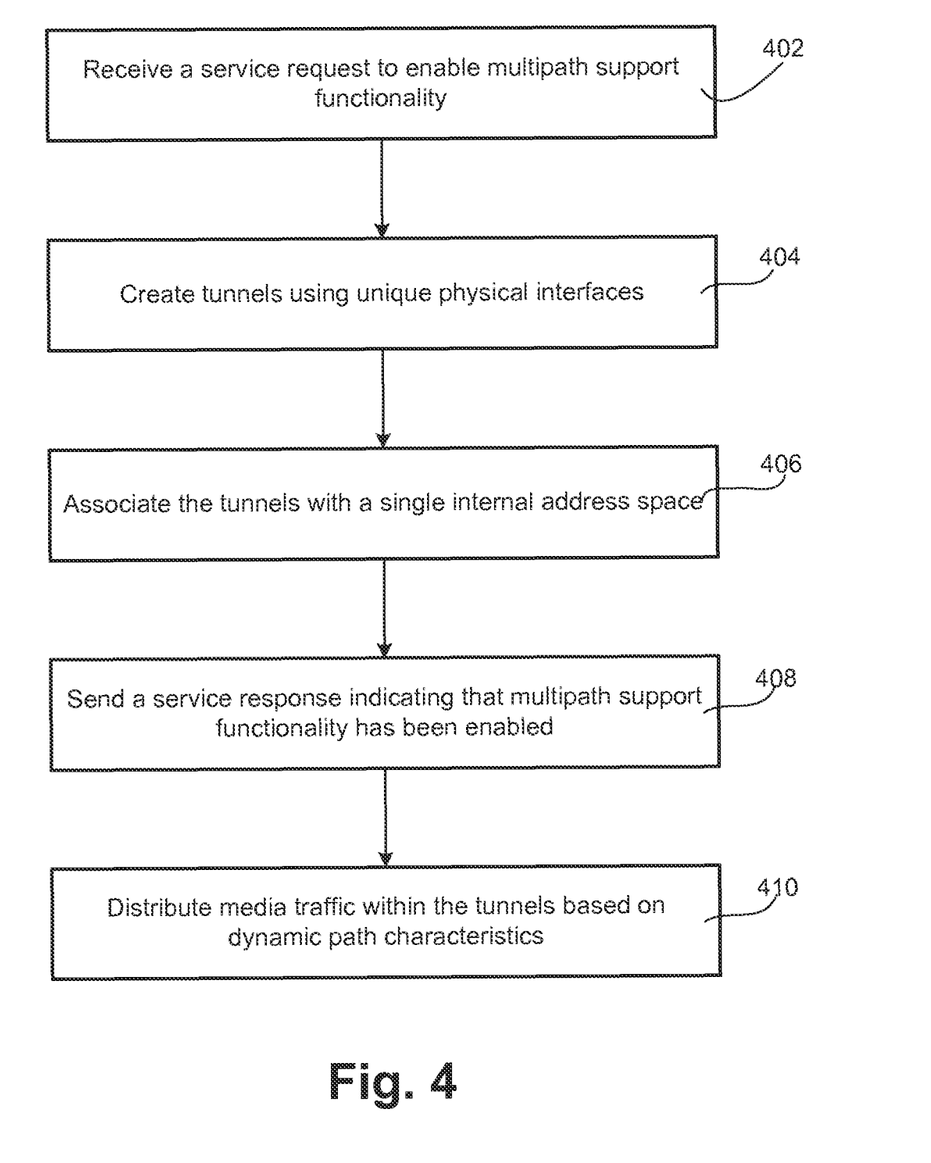
FIG. 4 illustrates a flow diagram of the functionality of a multipath support module, according to an embodiment of the invention.

FIG. 4 illustrates a flow diagram of the functionality of a multipath support module (such as multipath support module 16 of FIG. 1), according to an embodiment of the invention. In one embodiment, the functionality of the flow diagram of FIG. 4 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 402. At 402, a service request to enable multipath support functionality is received. In certain embodiments, a detected number of extra physical interfaces encoded as a level value within the service request can also be received. The flow then proceeds to 404.

At 404, one or more tunnels are created using one or more unique physical interfaces. In certain embodiments where a detected number of extra physical interfaces encoded as a level value is also received, a number of tunnels that is equal to the level value can be reserved. Further, in some embodiments, one or more configuration requests to create the one or more tunnels can be received, and one or more configurations responses indicating that the one or more tunnels have been created can be sent. Even further, in certain embodiments, the one or more tunnels can be additional tunnels in addition to an initial tunnel that is created using a unique physical interface. In some embodiments, the one or more unique physical interfaces can be one or more unique transceivers. Further, in certain embodiments, the tunnels can be TSCF tunnels. The flow then proceeds to 406.

At 406, the one or more tunnels are associated with a single internal address space, where the single internal address includes one or more internal addresses. The flow then proceeds to 408.

At 408, a service response is sent, the service response indicating that multipath support functionality has been enabled. In certain embodiments, a list of one or more reserved tunneling identifiers that uniquely identify the one or more tunnels can also be sent within the service response. The flow then proceeds to 410.

At 410, media traffic is distributed within the one or more tunnels based on one or more dynamic path characteristics. In certain embodiments, the one or more dynamic path characteristics can include one or more fixed ratios. In other embodiments, the one or more dynamic path characteristics can include one or more QoS metrics. In some of these embodiments, the one or more QoS metrics can include: packet loss; jitter; bit rate; bit error rate; end-to-end delay; or RTT. Further, in certain embodiments, the media traffic can include one or more encapsulated packets including media data, where the media data can include: audio data; or video data. The flow then ends.

Thus, in one embodiment, a tunneling server establishes multiple tunnels and distributes media traffic over the multiple tunnels using multiple physical interfaces based on dynamic path characteristics. This can improve the functionality of the tunneling server (and a corresponding server and user equipment) by improving RTC through utilizing the typical redundancy of physical interfaces in mobile devices. In addition, the improved functionality is performed well within a tunneling architecture, and thus, is transparent to a client application.

The features, structures, or characteristics of the invention described throughout this specification may be combined in any suitable manner in one or more embodiments. For example, the usage of "one embodiment", "some embodiments", "certain embodiment", "certain embodiments", or other similar language, throughout this specification refers to the fact that a particular feature, structure, or characteristic described in connection with the embodiment may be included in at least one embodiment of the present invention. Thus, appearances of the phrases "one embodiment", "some embodiments", "a certain embodiment", "certain embodiments", or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to perform multipath support functionality for real-time communications (RTC), the multipath support functionality comprising:
   receiving, by a tunneling server, a service request to establish an initial tunnel from a tunneling client;
   creating a first tunnel with a first unique physical interface;
   associating the first tunnel with a single internal address space comprising a plurality of internal addresses;
   receiving, by a tunneling server, a service request to enable multipath support functionality from the tunneling client;
   creating a second tunnel with a second unique physical interface;
   associating the second tunnel with the single internal address space;
   sending a service response to the tunneling client, the service response indicating that multipath support functionality has been enabled; and
   distributing media traffic within the first tunnel and the second tunnel based on a dynamic path characteristic.

2. The non-transitory computer-readable medium of claim 1,
   wherein the receiving a service request to enable multipath support functionality further comprises receiving a detected number of extra physical interfaces encoded as a level value within the service request;
   wherein the creating the second tunnel further comprises reserving a number of tunnels that is equal to the level value within the service request; and
   wherein the sending the service response further comprises sending a list of reserved tunneling identifiers that uniquely identify the second tunnel within the service response.

3. The non-transitory computer-readable medium of claim 1, wherein the creating the second tunnel further comprises:
   receiving a configuration request to create the second tunnel from the tunneling client; and
   sending a configuration response to the tunneling client indicating that the second tunnel has been created.

4. The non-transitory computer-readable medium of claim 1, wherein the unique physical interfaces comprise unique transceivers.

5. The non-transitory computer-readable medium of claim 1, wherein the dynamic path characteristics comprise a fixed ratio.

6. The non-transitory computer-readable medium of claim 1, wherein the dynamic path characteristics comprise a quality of service (QoS) metric.

7. The non-transitory computer-readable medium of claim 6, wherein the QoS metric comprises at least one of: packet loss; jitter; bit rate; bit error rate; end-to-end delay; or round trip time (RTT).

8. The non-transitory computer-readable medium of claim 1, wherein the media traffic comprises a plurality of encapsulated packets comprising media data, the media data comprising audio data or video data.

9. The non-transitory computer-readable medium of claim 1, wherein the first and second tunnels are Tunneled Services Control Function (TSCF) tunnels.

10. A computer-implemented method for performing multipath support functionality for RTC, the computer-implemented method comprising:
- receiving, by a tunneling server, a service request to establish an initial tunnel from a tunneling client;
- creating a first tunnel with a corresponding unique physical interface;
- associating the first tunnel with a single internal address space comprising a plurality of internal addresses;
- receiving, by a tunneling server, a service request to enable multipath support functionality from the tunneling client;
- creating a second tunnel with a corresponding unique physical interface;
- associating the second tunnel with the single internal address space;
- sending a service response to the tunneling client, the service response indicating that multipath support functionality has been enabled; and
- distributing media traffic within the first tunnel and the second tunnel based on a dynamic path characteristic.

11. The computer-implemented method of claim 10,
- wherein the receiving a service request to enable multipath support functionality further comprises receiving a detected number of extra physical interfaces encoded as a level value within the service request;
- wherein the creating the second tunnel further comprises reserving a number of tunnels that is equal to the level value within the service request; and
- wherein the sending the service response further comprises sending a list of reserved tunneling identifiers that uniquely identify the second tunnel within the service response.

12. The computer-implemented method of claim 10, wherein the creating the second tunnel further comprises:
- receiving a configuration request to create the second tunnel from the tunneling client; and
- sending a configuration response to the tunneling client indicating that the second tunnel has been created.

13. The computer-implemented method of claim 10, wherein the unique physical interfaces comprise unique transceivers.

14. A system for performing multipath support functionality, the system comprising:
- a processor;
- a non-transitory machine readable medium to store one or more instructions, which when executed by the processor causes the system to perform multipath support functionality for real-time communications (RTC), the system configured to:
- receive, by a tunneling server, a service request to establish an initial tunnel from a tunneling client;
- create a first tunnel with a corresponding unique physical interface;
- associate the first tunnel with a single internal address space comprising a plurality of internal addresses;
- receive a service request to enable multipath support functionality from the tunneling client;
- create a second tunnel with a corresponding unique physical interface;
- associate the second tunnel with the single internal address space;
- send a service response to the tunneling client, the service response indicating that multipath support functionality has been enabled; and
- distribute media traffic within the first tunnel and the second tunnel based on a dynamic path characteristic.

15. The system of claim 14, further configured to:
- receive a detected number of extra physical interfaces encoded as a level value within the service request;
- reserve a number of tunnels that is equal to the level value within the service request; and
- send a list of reserved tunneling identifiers that uniquely identify the second tunnel within the service response.

16. The system of claim 14, further configured to:
- receive a configuration request to create the second tunnel from the tunneling client; and
- send a configuration response to the tunneling client indicating that the second tunnel has been created.

17. The system of claim 14, wherein the unique physical interfaces comprise unique transceivers.

* * * * *

UNITED STATES PATENT AND TRADEMARK OFFICE
CERTIFICATE OF CORRECTION

PATENT NO. : 9,929,879 B2
APPLICATION NO. : 14/734300
DATED : March 27, 2018
INVENTOR(S) : Herrero et al.

Page 1 of 1

It is certified that error appears in the above-identified patent and that said Letters Patent is hereby corrected as shown below:

In the Specification

In Column 2, Line 48, delete "768)," and insert -- 768, --, therefor.

Signed and Sealed this
Twenty-eighth Day of August, 2018

Andrei Iancu
*Director of the United States Patent and Trademark Office*